US012387742B2

(12) United States Patent
Saraf et al.

(10) Patent No.: US 12,387,742 B2
(45) Date of Patent: Aug. 12, 2025

(54) AGE ESTIMATION FROM SPEECH

(71) Applicant: Pindrop Security, Inc., Atlanta, GA (US)

(72) Inventors: Amruta Saraf, Atlanta, GA (US); Elie Khoury, Atlanta, GA (US); Ganesh Sivaraman, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 366 days.

(21) Appl. No.: 17/960,725

(22) Filed: Oct. 5, 2022

(65) Prior Publication Data

US 2023/0107741 A1 Apr. 6, 2023

Related U.S. Application Data

(60) Provisional application No. 63/253,057, filed on Oct. 6, 2021, provisional application No. 63/253,197, filed
(Continued)

(51) Int. Cl.
G10L 25/00 (2013.01)
G10L 25/24 (2013.01)
G10L 25/30 (2013.01)

(52) U.S. Cl.
CPC .............. *G10L 25/30* (2013.01); *G10L 25/24* (2013.01)

(58) Field of Classification Search
CPC ......... G10L 25/30; G10L 25/24; G10L 17/04; G10L 17/26; G10L 15/25; G10L 17/00;
(Continued)

(56) References Cited

U.S. PATENT DOCUMENTS 8,122,259 B2 * 2/2012 Menczel .................. G05B 1/03
713/184
8,549,319 B2 * 10/2013 Menczel ................ G06V 40/10
713/184
(Continued)

OTHER PUBLICATIONS

Gao et al. "Age Estimation Using Expectation of Label Distribution Learning", IJCAI, Jul. 13, 2018, pp. 712-718 [online], [retrieved on Nov. 13, 2024]. (Year: 2018).*
(Continued)

*Primary Examiner* — Edgar X Guerra-Erazo
(74) *Attorney, Agent, or Firm* — Foley & Lardner LLP

(57) ABSTRACT

Disclosed are systems and methods including computing-processes executing machine-learning architectures implementing label distribution loss functions to improve age estimation performance and generalization. The machine-learning architecture includes a front-end neural network architecture defining a speaker embedding extraction engine of the machine-learning architecture, and a backend neural network architecture defining an age estimation engine of the machine-learning architecture. The embedding extractor is trained to extract low-level acoustic features of a speaker's speech, such as mel-frequency cepstral coefficients (MFCCs), from audio signals, and then extract a feature vector or speaker embedding vector that mathematically represents the low-level features of the speaker. The age estimator is trained to generate an estimated age for the speaker and a Gaussian probability distribution around the estimated age, by applying the various types of layers of the age estimator on the speaker embedding.

20 Claims, 6 Drawing Sheets

Related U.S. Application Data on Oct. 7, 2021, provisional application No. 63/325,047, filed on Mar. 29, 2022.

(58) Field of Classification Search
CPC ......... G10L 15/02; G10L 15/01; G10L 15/06; G10L 15/063; G10L 2015/0631; G10L 2015/0635; G10L 2015/0636; G10L 15/075; G10L 15/07; G10L 15/065; G10L 15/083; G10L 15/16; G10L 15/30; G10L 15/34; G10L 15/32; G10L 17/02; G10L 17/06; G10L 17/08; G10L 17/12; G10L 17/14; G10L 17/18; G10L 17/24; G10L 17/20; G10L 21/00; G10L 21/028; G10L 25/27; G10L 25/33; G10L 25/51; G10L 25/60; G10L 25/63; G10L 25/66; G10L 25/69; G10L 25/75; G10L 2025/783; G10L 2025/786; G10L 25/81; G10L 25/84; G10L 25/87; G06N 20/00; G06N 3/043; G06N 3/02; G06N 3/042; G06N 3/045; G06N 3/0455; G06N 3/0464; G06N 3/047; G06N 3/0475; G06N 3/048; G06N 3/08; G06N 3/098; G06N 3/0985; G06N 7/01; G06N 7/00; G06N 20/10; G06N 20/20

See application file for complete search history.

(56) References Cited

U.S. PATENT DOCUMENTS

| | | | | |
|---|---|---|---|---|
| 2007/0050636 A1* | 3/2007 | Menczel | ............... | G07C 9/37 713/186 |
| 2013/0015952 A1* | 1/2013 | Menczel | ............... | G07C 9/37 340/5.82 |
| 2015/0084738 A1* | 3/2015 | Menczel | ............... | G07C 9/37 340/5.83 |
| 2018/0060470 A1* | 3/2018 | Joshi | ............... | G06F 17/18 |
| 2019/0325864 A1* | 10/2019 | Anders | ............... | G10L 15/19 |
| 2020/0210893 A1* | 7/2020 | Harada | ............... | G06N 7/01 |
| 2022/0277752 A1* | 9/2022 | Zhang | ............... | G10L 17/06 |

OTHER PUBLICATIONS

Ghahremani et al. "End-to-End Deep Neural Network Age Estimation", Interspeech, Sep. 2018, pp. 277-281 [online], (retrieved on Nov. 13, 2024]. (Year: 2018).*

Saraf, A., & Khoury, E. (May 2022). Distribution learning for age estimation from speech. In ICASSP 2022-2022 IEEE International Conference on Acoustics, Speech and Signal Processing (ICASSP) (pp. 8552-8556). IEEE. (Year: 2022).*

Gao et al. "Age Estimation Using Expectation of Label Distribution Learning", IJCAI, Jul. 13, 2018, pp. 712-718 [online], [retrieved on Jan. 4, 2023]. Retrieved from the Internet <URL:http://palm.seu.edu.cn/xgeng/files/ijcai18d.pdf >, entire document, especially p. 714 col. 2 para 5, p. 715 col. 1 para 3.

Ghahremani et al. "End-to-End Deep Neural Network Age Estimation", Interspeech, Sep. 2018, pp. 277-281 [online], (retrieved on Jan. 4, 2023]. Retrieved from the Internet <URL:http://danlelpovey.com/files/2018_inlerspeech_age_estlmalion.pdf >, entire document, especially p. 3 col. 1 para 1, p. 1 col. 2 para 2-3, p. 2 Figure 1, p. 2 col. 1 para 1, p. 3 col. 2 para 4, p. 3 col. 1 para 1, p. 3 col. 2 para 4.

International Search Report and Written Opinion on PCT App. Serial No. PCT/US2022/045777 dated Feb. 9, 2023 (14 pages).

* cited by examiner

AGE ESTIMATION FROM SPEECH

CROSS-REFERENCE TO RELATED APPLICATIONS

This application claims priority to U.S. Provisional Application No. 63/325,047, entitled "Confidence Measure for Automatic Age Estimation from Speech," filed Mar. 29, 2022; U.S. Provisional Application No. 63/253,197, entitled "Age Estimation from Speech," filed Oct. 7, 2021; and U.S. Provisional Application No. 63/253,057, entitled "Age Estimation from Speech," filed Oct. 6, 2021, each of which is incorporated by reference in its entirety.

TECHNICAL FIELD

This application generally relates to systems and methods for managing, training, and deploying a machine learning architecture for audio processing.

BACKGROUND

Voice biometric-based operations are growing increasingly common, as voice-based channels are growing increasingly common, such as call centers and voice-interface devices, such as voice assistants. Age estimation for speech-based or other biometrics machine-learning systems is becoming important with the increasing use machine-learning systems applied to voice-based communication channels. A problem is the limited amount of datasets useful for training machine-learning models for age estimation. Databases for speech based age estimation are scarce, making it necessary to have age estimation systems that generalize well.

Moreover, conventional approaches for speech-based age estimation implement regression or classification techniques, viewing the speech-based age estimation as a regression or classification problem. However, these approaches do not incorporate or consider ambiguities or ordinal rankings in age estimation, which humans often consider when estimating a speaker's age. This creates ineffectiveness when outputting the results and causes inefficiencies during training.

SUMMARY

What is needed are machine-learning architecture for age estimation, including computing systems that efficiently training and developing the machine-learning architecture for age estimation despite the limited availability of training datasets. What is also needed is a means of training the machine-learning architecture for age estimation that accommodates uncertainty or ambiguity in the estimated age. Disclosed herein are systems and methods capable of addressing the above-described shortcomings and may also provide any number of additional or alternative benefits and advantages. Embodiments include a computing device that executes software routines of one or more machine-learning architectures for speech-based age estimation.

The machine-learning architecture implements label distribution modeling and loss functions to improve age estimation performance and generalization. The machine-learning architecture includes a front-end neural network architecture defining a speaker embedding extraction engine (sometimes referred to as an "embedding extractor") of the machine-learning architecture, and a backend neural network architecture defining an age estimation engine (sometimes referred to as an "age estimator") of the machine-learning architecture. The embedding extractor is trained to extract low-level acoustic features of a speaker's speech, such as mel-frequency cepstral coefficients (MFCCs), from audio signals, and then extract a feature vector or speaker embedding vector that mathematically represents the low-level features of the speaker. The age estimator is trained to generate an estimated age for the speaker and a Gaussian probability distribution around the estimated age, by applying the various types of layers of the age estimator on the speaker embedding.

During training, or in some cases during testing (sometimes referred to "deployment" or "production"), the age estimator references a ground truth, actual age of the speaker to adjust the hyper-parameters or weights of the age estimator layers and/or to generate or update a trained expected probability distribution. In training, training speaker labels indicate the speaker's actual age, which the age estimator references to generate a distribution using the actual age as a mean (or other parameter) of the distribution. In some cases, loss layers of the age estimator compare a predicted mean (or predicted age) and predicted distribution against the expected actual age in the speaker label to determine a distance between an expected distribution having a predicted age compared against the predicted distribution having the predicted age. The loss layers may then adjust the weights or hyper-parameters of the age estimator and, in backpropagation, re-feeds the training signals for the speakers into the age estimator to improve performance of the layers of the age estimator. The computing device executing the machine-learning architecture stores the trained age estimator and the trained expected probability distribution into non-transitory machine-readable storage.

At deployment, the computing device applies the trained age estimator on an inbound speaker embedding for an inbound speaker of an inbound audio signal. The age estimator generates an inbound predicted distribution according to preconfigured distribution parameters and trained layers of the age estimator. The operational layers (e.g., dense layers, softmax layers, dropout layers) of the age estimator then generate an inbound estimated age of the inbound speaker. The loss layers determine the distance between the inbound predicted distribution and the trained expected probability distribution, where this distance represents a level of error or confidence score associated with the outputs of the age estimator. In some cases, the age estimator generated the trained expected probability during the training phase. Additionally or alternatively, the age estimator receives inputs or pre-stored enrollment information indicating the actual age of the inbound speaker, which the age estimator references for the actual age and/or generating the expected probability distribution.

Embodiments may include various types of downstream operations (e.g., speaker identification, speaker verification or authentication, speaker diarization, age-based or parental controls) that reference the outputs of the embedding extractor and age estimator. As an example, a speaker authentication operation verifies whether an inbound speaker is an enrolled or known speaker. In this example, the machine-learning architecture or downstream authentication operation determines whether an inbound speaker embedding satisfies a voice-match threshold distance from an enrolled voiceprint embedding, and determines whether an inbound estimated age of the inbound speaker is within an age-match threshold distance with an enrolled expected age, and in some cases the estimated age must have a confidence score satisfying a threshold confidence score. In another example, a software application verifies whether to permit or unlock certain features or functions according to the speaker's age. In this example, the machine-learning architecture or software application determines whether the inbound estimated age of the inbound speaker satisfies an age-match threshold (e.g., 18 years-old), and in some cases, the estimate age must have a confidence score satisfying a threshold confidence score.

In an embodiment, a computer-implemented method comprises obtaining, by a computer, a plurality of training speaker embeddings extracted for a plurality of training audio signals of a plurality of training speakers; training, by the computer, the age estimator of a machine-learning architecture to generate an estimated age and a probability distribution by applying the age estimator on the plurality of training speaker embeddings of the plurality of training speakers using a plurality of speaker labels, each speaker label indicating an actual age of a corresponding training speaker; obtaining, by the computer, an inbound speaker embedding for an inbound audio signal of an inbound speaker; generating, by the computer applying the age estimator on the inbound speaker embedding, an inbound probability distribution for the inbound speaker; and generating, by the computer applying the age estimator on the inbound speaker embedding, an estimated age of the inbound speaker and a confidence score based upon the estimated probability distribution.

In another embodiment, a system comprises a computer comprising a processor configured to obtain a plurality of training speaker embeddings extracted for a plurality of training audio signals of a plurality of training speakers; train the age estimator of a machine-learning architecture to generate an estimated age and a probability distribution by applying the age estimator on the plurality of training speaker embeddings of the plurality of training speakers using a plurality of speaker labels, each speaker label indicating an actual age of a corresponding training speaker; obtain an inbound speaker embedding for an inbound audio signal of an inbound speaker; generate, by applying the age estimator on the inbound speaker embedding, an inbound probability distribution for the inbound speaker; and generate, by applying the age estimator on the inbound speaker embedding, an estimated age of the inbound speaker and a confidence score based upon the estimated probability distribution.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
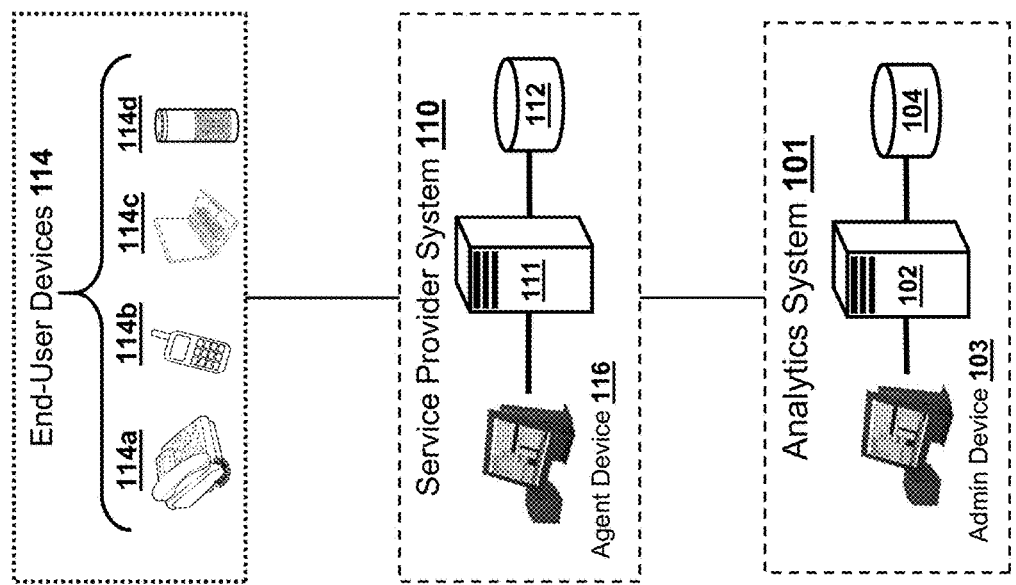
FIG. 1 shows components of a system for processing authentication requests on behalf of a variety of computing services accessed by end-users, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Age estimation from speech is becoming important with increasing usage of the voice channel. As an example, call centers can use age estimates to influence call routing or provide security by authenticating speakers by comparing the estimated age against a speaker's age on-file, stored in one or more registration databases. As another example, voice assistant devices or similar Internet-of-Things (IoT) devices may reference the age estimation to determine whether to apply age-based controls or parental controls. Conventional approaches for speech-based age estimation implement regression or classification techniques, viewing the speech-based age estimation as a regression or classification problem. However, these approaches do not incorporate or consider ambiguities or ordinal rankings in age estimation, which humans often consider when estimating a speaker's age.

The loss functions for speaker age estimation may vary based upon one or more learning approaches implemented, including regression-based learning approaches and classification-based learning approaches.

In a regression approach, an age estimator neural network architecture include a dense layer with Relu activation, followed by a second dense layer with Linear activation, and finally a dense layer with a single neuron that outputs the estimated age. In training, an age estimator may then apply the loss function(s) that perform regression-learning functions using the estimated age and sometimes using speaker labels. The regression-based loss functions attempt to generate an exact predicted age of the speaker by penalizing the difference between an expected true age and the estimated age during the training using the particular loss function.

For a classification, ranking, or distribution-based learning approach, the age estimator includes, for example, a dense layer with Relu activation followed by a softmax layer configured according to an age range. The distinction between the classification-based learning and the ranking or distribution-based learning is the type of loss function executed by the age estimator during training.

In the regression-based approaches, the loss function includes, for example, mean square error (MSE) or mean absolute error (MAE), among others. The regression approach offers the advantage of relatively lower error-contribution for estimated ages predicted closer to a ground truth label (e.g., speaker training labels). However, regression loss functions often limit flexibility in the range around the ground truth labels during training.

In the classification-based loss functions, each year of age maps to an exact age-based class (label-to-year indicated by the speaker labels), referenced during training by a classifier layer of the machine-learning architecture. The exactness of each classification (label-to-year), however, leaves the quality of the age estimator vulnerable to error caused by misclassification. A misclassified predicted age nearer to the ground truth in the speaker label and a misclassified predicted estimated age further from the expected ground truth in the speaker label contribute equally to the level of error of the age estimator, regardless of a rank-ordering of the estimated ages outputted during training or deployment. The classification approaches ignore the rank ordering and correlation between neighboring ages during training, creating opportunities for misclassifications, and flawed or inefficient training; particularly as the classification approaches attempt to estimate exact ages.

Embodiments described herein implement distribution-based loss functions for age estimation. When asked to estimate a person's age in a speech sample, humans can readily provide an age estimate and a particular confidence interval. In distribution-based approaches, the age estimator implements probability distributions and loss functions that consider and accommodate a level of ambiguity when estimating the speaker's age by generating and comparing Gaussian distributions where the estimated age or actual age are taken as the mean (or other parameter) of the distributions. In the distribution-based approach, the loss functions measure an amount of distance or similarity between two distributions (e.g., an expected probability distribution and a predicted probability distribution).

Example System Components

FIG. 1 shows components of a system 100 for processing authentication requests on behalf of a variety of computing services accessed by end-users. The system 100 comprises enterprise-computing infrastructures 101, 110, including an analytics system 101 and one or more service provider systems 110. The system 100 further includes any number of end-user devices 114a-114c (collectively referred to as an end-user device 114 or end-user devices 114). The system 100 includes one or more external networks (not shown) through which the devices of the enterprise computing infrastructures 101, 110 and the end-user devices 114 communicate. The component computing devices of the analytics system 101 may communicate via one or more internal networks (not shown); and likewise the computing devices of the service provider system 110 may communicate via the one or more internal networks. The system 100 implements one or more machine-learning architectures having layers or functions defining one or more functional engines 122a-122d (collectively referred to as a functional engine 122 or functional engines 122) for identifying, recognizing, or authenticating end-users based upon multi-model, multi-device, and/or frictionless authentication operations for interactions between the end-user devices 114 and computing services 105 or other functions of the system 100, such functions performed by user devices 114 or hosted on the various provider servers 106.

Embodiments may comprise additional or alternative components or omit certain components from those of the example system 100 and still fall within the scope of this disclosure. It may be common, for example, to include multiple analytics servers 102. Embodiments may include or otherwise implement any number of devices capable of performing the various features and tasks described herein. For example, FIG. 1 shows the analytics server 102 as a distinct computing device from the analytics database 104. In some embodiments, the analytics database 104 includes an integrated analytics server 102.

The system 100 includes one or more external networks and/or internal networks comprising various hardware and software components of one or more public or private networks, interconnecting the various components of the system 100. Non-limiting examples of such external networks may include Local Area Network (LAN), Wireless Local Area Network (WLAN), Metropolitan Area Network (MAN), Wide Area Network (WAN), and the Internet. The communication over the external networks 120 may be performed in accordance with various communication protocols, such as Transmission Control Protocol and Internet Protocol (TCP/IP), User Datagram Protocol (UDP), and IEEE communication protocols. Likewise, the end-user devices 114 use the external networks 120 for communicating with the customer-facing service provider systems 110 or the analytics system 101 via telephony and telecommunications protocols, hardware, and software capable of hosting, transporting, and exchanging audiovisual data (e.g., computer files, data stream). Non-limiting examples of telecommunications and/or computing networking hardware may include switches and trunks, among other additional or alternative hardware used for hosting, routing, or managing data communication, circuits, and signaling via the Internet or other device communications medium. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, network or Internet service providers, and exchanges, among others.

The end-user devices 114 include any communications or computing device that the end-user operates to access the services of the provider system 110 through the various communications channels. For instance, a speaker (end-user) may place a call to the provider system 110 through a telephony network or through a software application executed by the end-user device 114. Non-limiting examples of end-user devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The end-user device 114 is not limited to the telecommunications-oriented devices or channels. For instance, in some cases, the mobile phones 114b may communicate via a computing network channel (e.g., the Internet). The end-user device 114 may also include an electronic device comprising a processor and/or software, such as a caller computing device 114c or edge device 114d implementing, for example, voice-over-IP (VoIP) telecommunications, data streaming via a TCP/IP network, or other computing network channel. The edge device 114d may include any IoT device or other electronic device for network communications. The edge device 114d could be any smart device capable of executing software applications and/or performing voice interface operations. Non-limiting examples of the edge device 114d may include voice assistant devices, automobiles, smart appliances, and the like.

The call analytics system 101 and the provider system 110 represent network infrastructures 101, 110 comprising physically and logically related software and electronic devices managed or operated by various enterprise organizations. The devices of each network system infrastructure 101, 110 are configured to provide the intended services of the particular enterprise organization. The analytics system 101 and service provider systems 110 represent computing network infrastructures 101, 110, comprising logically related software and/or physically related electronic devices, managed or operated by an enterprise organization hosting various types of services to the end-users, end-user devices 114, or other enterprise infrastructures 101, 110.

The analytics system 101 comprises various hardware and software components that capture and store various types of data or metadata related to the speaker's contact with the provider system 110. The provider system 110 comprises various hardware and software components that capture and store various types of data or metadata related to the speaker's contact with the provider system 110. This contact data (e.g., call data, device intercommunication data) may include, for example, audio recordings of the call or the speaker's voice and metadata related to the protocols and software employed for the particular communication channel.

Turning to the analytics system 101, the analytics system 101 includes analytics servers 102, administrator (admin) devices 103, and analytics databases 104. Although FIG. 1 shows only single analytics server 102, the analytics server 102 may include any number of computing devices.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more provider systems 110. Although FIG. 1 shows only single analytics server 102, the analytics server 102 may include any number of computing devices. In some cases, the computing devices of the analytics server 102 may perform all or portions of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the provider system 110 (e.g., the provider server 111).

The analytics server 102 executes audio-processing software that includes one or more machine-learning architectures having machine-learning layers (e.g., neural network layers) or machine-executed functions defining an embedding extraction engine (sometimes referred to as an "embedding extractor") and an age estimation engine (sometimes referred to as an "age estimator"), among other potential layers or functions. Non-limiting examples of additional layers or functions of the machine-learning architecture may include data augmentation, audio signal pre-processing, audio signal enhancement, speaker verification or authentication (including cross-channel speaker verification), and speaker diarization, among others. For ease of description, the analytics server 102 executes a single machine-learning architecture having a neural network architecture for the embedding extractor and neural network architecture for the age estimator, though embodiments may implement any number of machine-learning architectures of various types of machine-learning techniques or layers (such as machine-learning layers defining neural network architectures).

As mentioned, in some implementations, the analytics server 102 or other computing device (e.g., provider server 111) of the system 100 performs the various pre-processing operations and/or data augmentation operations on the input audio signals. Non-limiting examples of the pre-processing operations on inputted audio signals include: parsing the audio data into fixed frames or sub-frames, transforming the audio data from a time-domain representation into a frequency-domain representation according to an FFT of SFT algorithm, and performing normalization or scaling functions, among other potential pre-processing operations. Non-limiting examples of augmentation operations include performing bandwidth expansion, down-sampling or up-sampling, audio clipping, noise augmentation, frequency augmentation, and duration augmentation, among others.

In some cases, the analytics server 102 may perform one or more pre-processing or data augmentation operations prior to feeding an input audio signal into the input layers of the machine-learning architecture. In some cases, additionally or alternatively, the analytics server 102 executes one or more pre-processing or data augmentation operations when executing the machine-learning architecture, where the input layers (or other layers) of the machine-learning architecture perform the pre-processing or data augmentation operations. For example, in these cases, the machine-learning architecture comprises "in-network" input layers and/or data augmentation layers that perform the pre-processing operations and/or data augmentation operations on the input audio signal fed into the machine-learning architecture.

During the training phase, the analytics server 102 receives training audio signals of various lengths and characteristics from one or more corpora, which may be stored in an analytics database 104 or other machine-readable non-transitory storage medium. The training audio signals (sometimes referred to as "training samples") include clean audio signals and simulated audio signals, each of which the analytics server 102 uses to train the various layers of the machine-learning architecture. The clean audio signals are audio samples containing speech in which the speech and the features are identifiable by the analytics server 102.

The analytics server 102 may retrieve the simulated audio signals from the more analytics databases 104 and/or generate the simulated audio signals by performing various data augmentation operations. In some cases, the data augmentation operations may generate a simulated audio signal for a given input audio signal (e.g., training signal, enrollment signal), in which the simulated audio signal contains manipulated features of the input audio signal mimicking the effects a particular type of signal degradation or distortion on the input audio signal. The analytics server 102 stores the training audio signals into the non-transitory medium of the analytics server 102 and/or the analytics database 104 for future reference or operations of the machine-learning architecture.

During the training phase (or in some implementations, the enrollment phase), one or more fully connected and/or feed-forward layers generate and output predicted age estimations and age distributions for the training audio signals. Loss layers perform various loss functions to evaluate the distances between the predicated age distributions and expected distributions, as indicated by labels associated with training signals. The loss layers, or other functions executed by the analytics server 102, tune the hyper-parameters of the machine-learning architecture until the distance between the predicted estimated wideband signals and the expected estimated wideband signals satisfies a threshold.

During an optional enrollment operational phase, an enrollee speaker, such as an end-consumer of the provider system 110, provides (to the call analytics system 101) a number of enrollee audio signals containing examples of the enrollee speech. As an example, the enrollee could respond to various interactive voice response (IVR) prompts of IVR software executed by a provider server 111 via a telephone channel. As another example, the enrollee could respond to various prompts generated by the provider server 111 and exchanged with a software application of the edge device 114d via a corresponding data communications channel. The provider server 111 then forwards the recorded responses containing bona fide enrollment audio signals to the analytics server 102. The analytics server 102 applies the trained machine-learning architecture to each of the enrollee audio samples and generates corresponding enrollee feature vectors (sometimes called "enrollee embeddings"), though the analytics server 102 disables certain layers, such as layers employed for training the machine-learning architecture. The analytics server 102 generates an average or otherwise algorithmically combines the enrollee feature vectors and stores the enrollee feature vectors into the analytics database 104 or the provider database 112. Optionally, the edge device generates the enrollee feature vectors by locally applying (on-device) the trained machine-learning architecture to each of the enrollee audio samples and then sends the enrollee feature vectors to the provider service 111 or analytics server 102.

Similar details of the training and enrollment phases for the speaker verification machine-learning architecture are described in U.S. application Ser. Nos. 17/066,210 and 17/079,082, which are incorporated by reference. In addition, the machine-learning architectures described herein may further include the layers of a speaker verification machine-learning, where the analytics server 102 (or other device of the system 100) executes the layers of the speaker verification machine-learning downstream from or in conjunction with the layers for age estimation.

Following the training phase or the optional enrollment phase, the analytics server 102 stores the trained machine-learning architecture into the analytics database 104 or provider database 112. In the optional enrollment phase, instructs the analytics server 102 receives instructions to enter the enrollment phase from a device of the system 100 (e.g., a provider server 111, agent device 116, admin device 103, or user device 114). The analytics server 102 retrieves a trained embedding extractor of the trained machine-learning architecture from the database 104, 112, and applies the embedding extractor on one or more enrollee audio signal to extract enrollment features and various enrollment embeddings (e.g., enrollment feature vectors, enrollment speaker embeddings, enrolled voiceprint) for the enrollee audio signals. The analytics server 102 then stores the extracted enrollment embeddings and the trained machine-learning architecture into the database 104, 112 for the deployment phase.

During the deployment phase (sometimes referred to as "testing" or "production"), the analytics server 102 receives the inbound audio signal of the inbound call, as originated from the end-user device 114 of an inbound speaker through a particular communications channel. The analytics server 102 applies the embedding extractor of the machine-learning architecture on the inbound audio signal to extract inbound features and inbound embeddings (e.g., inbound feature vectors, inbound speaker embeddings, inbound voiceprint) from the inbound audio signal and determine whether the speaker is an enrollee (e.g., enrolled-speaker, enrolled-user) who is enrolled with the provider system 110 or the analytics system 101.

The analytics server 102 generates the estimated age for the inbound audio signal, by applying the various layers of the machine-learning architecture on the inbound signal. The machine-learning architecture includes the machine-learning layers defining the age estimator, which the analytics server 102 applies on the input audio signal. The age estimator generates a predicted distribution using an estimated age as a mean (or other parameter) of the distribution and an estimated age. The age estimator references training labels or stored speaker data (e.g., enrolled user data) to determine an actual speaker age, which the age estimator uses to generate an expected distribution. In training, loss layers of the age estimator perform distribution-based loss functions that determine a level or error or distance between the predicted and expected age distributions using training speaker labels. The analytics server 102 adjust weights and hyper-parameters of the age estimator and re-feeds, in backpropagation, training audio signals to the age estimator to improve the level or error until a training threshold is satisfied. In deployment, the age estimator determines and outputs the predicted estimated age and predicted age distribution. The loss layers determine a level or error or distance between the predicted and expected age distribution, as indicated by predetermined stored speaker labels or administrator configurations.

In some embodiments, following the deployment phase, the analytics server 102 or another device of the system 100 (e.g., provider server 111) executes any number of downstream operations. These downstream operations employ the estimated age and, in some cases, the extracted inbound voiceprint embedding, as generated by the age estimator and embedding extractor during the deployment phase.

The analytics database 104 may contain any number of corpora of training audio signals that are accessible to the analytics server 102 via one or more networks. In some embodiments, the analytics server 102 employs supervised training to train the machine-learning architecture, where the analytics database 104 includes labels associated with the training audio signals that indicate, for example, the characteristics (e.g., speaker actual age) or features (e.g., MFCCs) of the training signals. The analytics server 102 may also query an external third-party database (not shown) to access a third-party corpus of one or more training audio signals. An administrator of the analytics system 101 may configure the analytics server 102 to select the training audio signals having certain features or characteristics. In some cases, the analytics database 104 may include registration or enrolled-user data, which the analytics system 101 receives from the various provider systems 110, indicating the enrolled speaker's actual age.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or provider system 110 and to issue queries and instructions to such components.

Turning to the provider systems 110, a provider system 110 includes provider servers 111, provider databases 112, and agent devices 116.

The provider server 111 of the service provider system 110 executes software processes for managing a call queue and/or routing calls made to the provider system 110 through the various channels, where the processes may include, for example, routing calls to the appropriate agent devices 116 based on the inbound speaker's comments, instructions, IVR inputs, or other inputs submitted during the inbound call. The provider server 111 can capture, query, or generate various types of information about the call, the speaker, and/or the end-user device 114 and forward the information to the agent device 116, where a graphical user interface (GUI) of the agent device 116 displays the information to an agent of the provider system 110 (e.g., call center agent). The provider server 111 also transmits the information about the inbound call to the analytics system 101 to perform various analytics processes on the inbound audio signal and any other audio data. The provider server 111 may transmit the information and the audio data based upon preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The provider database 112 includes information about end-user devices 114 or end-users, and hosted on non-transitory machine-readable storage medium of one or more computing devices (e.g., provider servers 111) of the provider system 110. The provider database 112 may contain any number of corpora of training audio signals that are accessible to the analytics server 102 via one or more networks. In some embodiments, the analytics server 102 employs supervised training to train the machine-learning architecture, where the analytics database 104 includes labels associated with the training audio signals that indicate, for example, the characteristics (e.g., speaker age) or low-level acoustic features (e.g., MFCCs) of the training signals. The analytics server 102 may also query an external third-party database (not shown) to access a third-party corpus of one or more training audio signals. An administrator of the analytics system 101 may configure the analytics server 102 to select the training audio signals having certain features or characteristics. In some embodiments, the provider database 112 includes registration or enrollee-user data. The enrollment data may include, for example, enrolled actual age, age distribution, enrolled features, and/or enrolled voiceprint vector.

The agent device 116 of the provider system 110 may allow agents or other users of the provider system 110 to configure operations of devices of the provider system 110. For calls made to the provider system 110, the agent device 116 receives and displays some or all of the relevant information associated with the call routed from the provider server 111.

Example Process Operations

Example Training and Deployment

Figure 2:
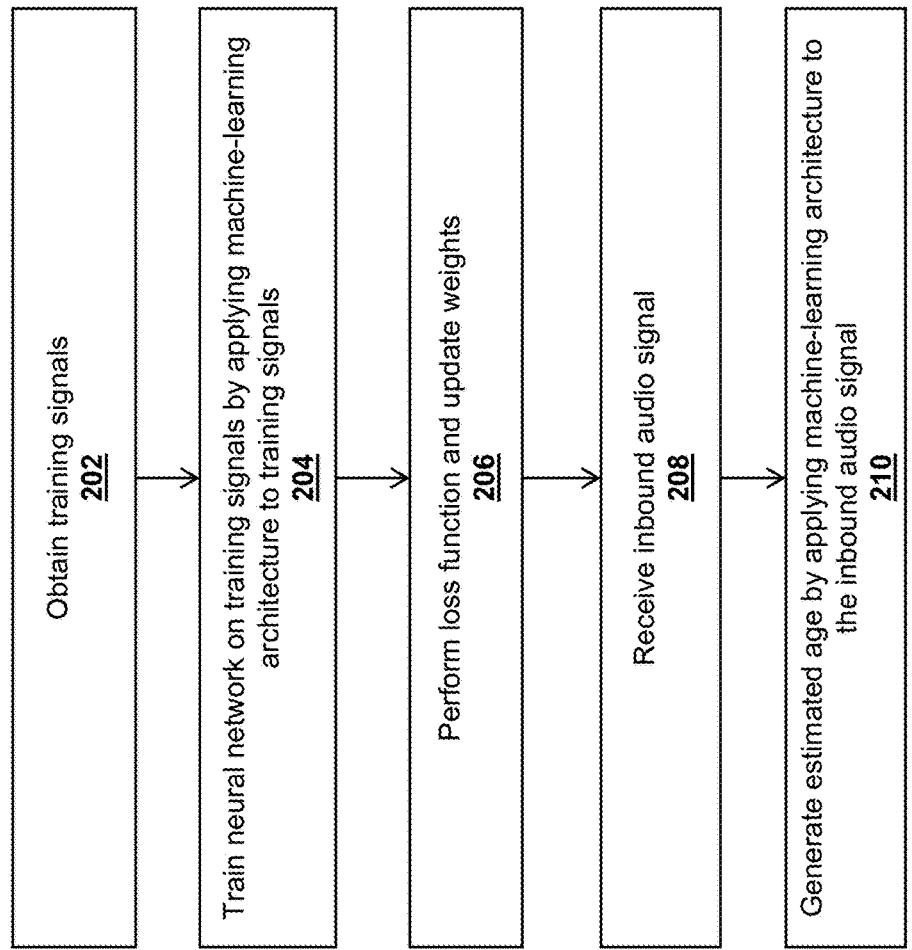
FIG. 2 shows steps of a method for training and deploying a machine-learning architecture for extracting speaker embeddings and age estimation, according to an embodiment.

FIG. 2 shows steps of a method 200 for training and deploying a machine-learning architecture for extracting speaker embeddings and age estimation. Embodiments may include additional, fewer, or different operations than those described in the method 200. A server (e.g., analytics server 102) performs the steps of the method 200 by executing machine-readable software code that includes the one or more machine-learning architectures, though embodiments may include any number of computing devices and/or processors that perform the various operations of the method 200.

The server executes a machine-learning architecture comprising layers or functions defining an embedding extractor and an age estimator, among other types of sub-component engines of the machine-learning architecture. In some embodiments, the machine-learning architecture includes multiple distinct machine-learning architectures; and in some embodiments, the machine-learning architecture includes a single machine-learning architecture. The server executes the software routines of the layers and functions of the machine-learning architecture in various operational phases, including a training phase, a deployment phase (sometimes referred to as the "testing phase" or "production phase"), and an optional enrollment phase (not shown in the example method 200).

The server ingests and applies the machine-learning architecture on one or more input audio signals, in accordance with the particular operational phase. The input audio signal refers to any audio signal that the server ingests and applies the machine-learning architecture on, including training signals during the training phase, enrollment signals received during the enrollment phase, and inbound audio signals received during the deployment phase.

In step 202, during the training phase, the server obtains any number of training audio signals and associated training labels corresponding to the training signals. The server places the machine-learning architecture into a training operational phase and the server obtains any number (sometimes thousands or hundreds of thousands) of training audio signals.

The server or input layers of the machine-learning architecture perform various pre-processing operations on an input audio signal (e.g., training audio signal, enrollment audio signal, inbound audio signal). These pre-processing operations may include, for example, extracting low-level features (e.g., MFCCs) from the audio signals and transforming these features from a time-domain representation into a frequency-domain representation by performing FFT and/or SFT transform operations. The pre-processing operations may also include parsing the audio signals into frames or sub-frames, and performing various normalization or scaling operations. Optionally, the server performs any number of pre-processing operations prior to feeding the audio data of the input audio signal into the input layers of the machine-learning architecture. The server may perform the various pre-processing operations in one or more of the operational phases, though the particular pre-processing operations performed may vary across the operational phases. The server may perform the various pre-processing operations separately from the machine-learning architecture or as in-network layer of the machine-learning architecture.

In some embodiments, the server or layers of the machine-learning architecture perform various data augmentation operations on the input audio signal (e.g., training audio signal, enrollment audio signal). The data augmentation operations generate various types of distortion or degradation of the input audio signal, such that the operational layers of the machine-learning architecture (e.g., convolutional layers of embedding extractor; softmax layers of age estimator) ingest the resulting augmented or distorted input audio signals. In some cases, the server generates simulated training audio signals having varied features or characteristics (e.g., variations on the speaker's voice characteristics), simulating various types of degradations on the low-level features and/or variations to the speaker's voice.

The server may perform the various data augmentation operations separate from the machine-learning architecture or as operations of in-network augmentation layers of the machine-learning architecture. Moreover, the server may perform the various data augmentation operations in one or more of the operational phases (e.g., training phase), though the particular augmentation operations performed may vary across each of the operational phases.

In step 204, the server trains neural network layers of the machine-learning architecture that defines an embedding extractor and an age estimator using the training audio signals by applying the machine-learning architecture on the training audio signals. The server applies the layers or functions of the machine-learning architecture to each of the training audio signals to train the layers of, for example, the embedding extractor and the age estimator. For each training signal, the embedding extractor generates a predicted training embedding for the speech audio in the particular training signal. Using the same or different training signals, the age estimator generates a predicated age distribution and predicted estimated ages.

In step 206, the server executes software routines of one or more loss layers that perform loss functions and update hyper-parameters and/or weights of the machine-learning architecture. In some embodiments, the machine-learning architecture the sub-component engines (e.g., embedding extractor, age estimator) comprise distinct loss layers, which separately train the particular sub-component engine. For instance, in the example method 200, the embedding extractor includes and executes a collection of loss layers for training the embedding extractor, distinct from another collection of loss layers of the age estimator that train the age estimator.

In some embodiments, the machine-learning architecture includes fused loss layers that collectively train the sub-component engines (e.g., embedding extractor, age estimator). Additionally or alternatively, in some embodiments, the machine-learning architecture includes distinct loss layers for separately training the sub-component engines, as well as fused loss layers that collectively train the sub-component engines.

For the embedding extractor, the loss layers perform loss functions that evaluate a level of error by referencing the training labels associated with the training signals, where the training labels indicate expected extractor outputs (e.g., expected training features, expected training vectors) for the corresponding training signal. The training labels include various information indicating, for example, the values or features of the expected extractor outputs. The various loss functions (e.g., means-square error loss function) determine the level of error based upon differences or similarities between a predicted extractor output (e.g., predicted training features, predicted training vectors) generated by the embedding extractor and the expected extractor output indicated by the corresponding training label. The loss layers of the embedding extractor may adjust the hyper-parameters of the embedding extractor to improve the level of error until the level of error satisfies a threshold level of error.

For the age estimator, the training labels include various information indicating, for example, the expected ground-truth ages and/or expected probability distribution around the ground-truth age. In some cases, the server determines the expected probability distribution around the ground truth age in one or more training labels. The loss layers perform distribution-based loss functions that evaluate a level of error between the predicted age distribution for one or more training signals and an expected age distribution around the ground-truth age in one or more speaker labels. The loss functions determine the level of error based upon differences or similarities between the predicted probability distribution generated by softmax layers and the expected probability distribution indicated by the training labels. The loss layers of the age estimator may adjust the hyper-parameters of the age estimator to improve the level of error until the level of error satisfies a threshold level of error. A goal of the loss function during training is to determine or learn one or more stable parameters (e.g., mean age; a parameter) of a Gaussian probability distribution for the speaker ages of the training signals. As a result of training the age estimator, the mean (or other parameter) of the Gaussian distribution will be will be near (within a threshold distance) or exactly equal to the expected age in the training label. For instance, a fully connected layer of the age estimator outputs the predicted age or predicted age distribution. The loss functions learn the parameters of the Gaussian distribution for the fully connected layer, such that the Gaussian distribution learned and applied by the age estimator has, for example, a mean equal to the to the age of the label.

As an example, starting with an untrained age estimator, the weights are still defaults or zeros. The server begins feeding new training signals for a first speaker who is 22 years-old according to the speaker training labels associated with the training signals of the first speaker. For a first training signal, the age estimator applies, for example, the dense layers, softmax layers, and fully connected layers of the age estimator on the training vector of the training audio signal to generate a predicted age of 65 years-old. The loss function determines a distance and performs back propagation based upon the expected speaker age of 22 years-old, as indicated by the speaker label. In operation, the age estimator determines there is a trained expected Gaussian distribution with a mean of 65 and a variance of a sigma of or about 23. The loss function then determines the distance or difference between the predicted age of 65 years-old and the expected age of 22 years-old, which is a distance of 44. The loss functions determine that the distance of 44 fails to satisfy a training threshold and, in the backpropagation operations, feeds additional training audio signal signals for the first speaker into the age estimator to adjust the weights and reduce the loss. The backpropagation operations of the loss function determine the loss is too large and needs reduced. After several iterations, or epochs, of further training signals, the distance or loss of the predicated mean of the predicted distribution generated for the first speaker begins reducing from, e.g., 65, to 60, to 42, and then eventually the mean of the predicated distribution is within a threshold distance of 22 or 23, which is the real age for the particular speaker as indicated by the speaker's training label. The age estimator repeats these loss functions for any number of speakers having any number of characteristics (e.g., ages, genders, accents, languages).

In determining the loss, the age estimator references the mean, rather than the estimated age as an integer. The ground truth determined by the server, or the speaker label, includes not just the expected age as a number. The server may actually transform that expected age into the distribution. For instance, the age estimator does not simply take the ground truth expected age of 55 as 55; the age estimate may assign a kind of variability to the expected age by assuming that the expected age is a mean with a normal distribution around 55 years-old. In this way, if the server does not receive any training samples for a 54-year-old speaker, generating a distribution having a mean around 55 may accommodate the scarcity of samples with 54-year-olds. As a result, during or after training the age estimator, the age estimator generates an inbound distribution having a mean center around 55, and the loss function determines a distance between the inbound probability distribution and the expected probability distribution. In some cases, this deviation may represent a level of confidence in the estimated age, allowing the age estimator to generate a "soft" age estimate with a particular level of error or confidence.

When training is completed, the server stores the hyperparameters into non-transitory memory of the server or other memory storage location (e.g., analytics database, provider database). After training, the server may fix the hyperparameters and/or weights of the machine-learning architecture by disabling certain layers or functions of the machine-learning architecture, thereby keeping the hyperparameters and/or weights unchanged.

In step 208, during the deployment phase, the server receives inbound audio signal data. The server receives the inbound audio signal including an inbound speaker's speech signal via a telephony-based communication channel (e.g., landline phone, mobile phone, VoIP). The input layers apply any number of pre-processing and/or data augmentation operations on the inbound audio signal to prepare the inbound audio for the embedding extractor or age estimator, among other layers or functions of the machine-learning architecture. As mentioned, the pre-processing operations may include parsing the audio signals into frames or sub-frames, executing a transform operation (e.g., FFT, SFT) that transforms the raw input audio signal into a spectrogram energy/frequency representation, extracting the spectral-temporal features, and performing various normalization or scaling operations. The input layers then feed the features of the inbound audio signal into the remaining layers of the machine-learning architecture (e.g., embedding extractor, age estimator).

In step 210, the server generates an inbound speaker embedding using the embedding extractor on the inbound signal data ingested by the input layers. The fully connected layers of the embedding extractor feeds the inbound speaker embedding to the age estimator, which the server applies to the inbound speaker embedding to generate an inbound predicted distribution and estimated age. The layers of the age estimator (e.g., dense layers, softmax layers, dropout layers, fully connected layers) output the estimate age, and a predicted distribution around the estimated age as the mean of the predicated distribution according to one or more preconfigured parameters. In some cases, the age estimator determines a deployment-time distance between the parameters (e.g., predicted mean, predicted age) of the predicted distribution and the parameters (e.g., expected mean, expected actual age) of the expected distribution, where the deployment-time distance may represent a level of error or confidence of the inbound predicted age estimation.

In some cases, after fully connected layers of the age estimator outputs the estimated age and the predicted distribution, the loss layers may update or re-train layers and/or distribution parameters when, for example, the distance fails to satisfy the age-match threshold, the confidence score fails a confidence threshold score, and/or a number of samples having the estimated age fails to satisfy a threshold number of signals for the particular estimated age.

In some embodiments, the server (or another computing device) executes downstream operations using the estimated age and, in some cases, the extracted inbound voiceprint embedding. For example, an authentication routine may determine the likelihood of fraud or likelihood that the speaker is an enrolled speaker.

Example User Registration, Enrollment, and Authentication

Figure 3:
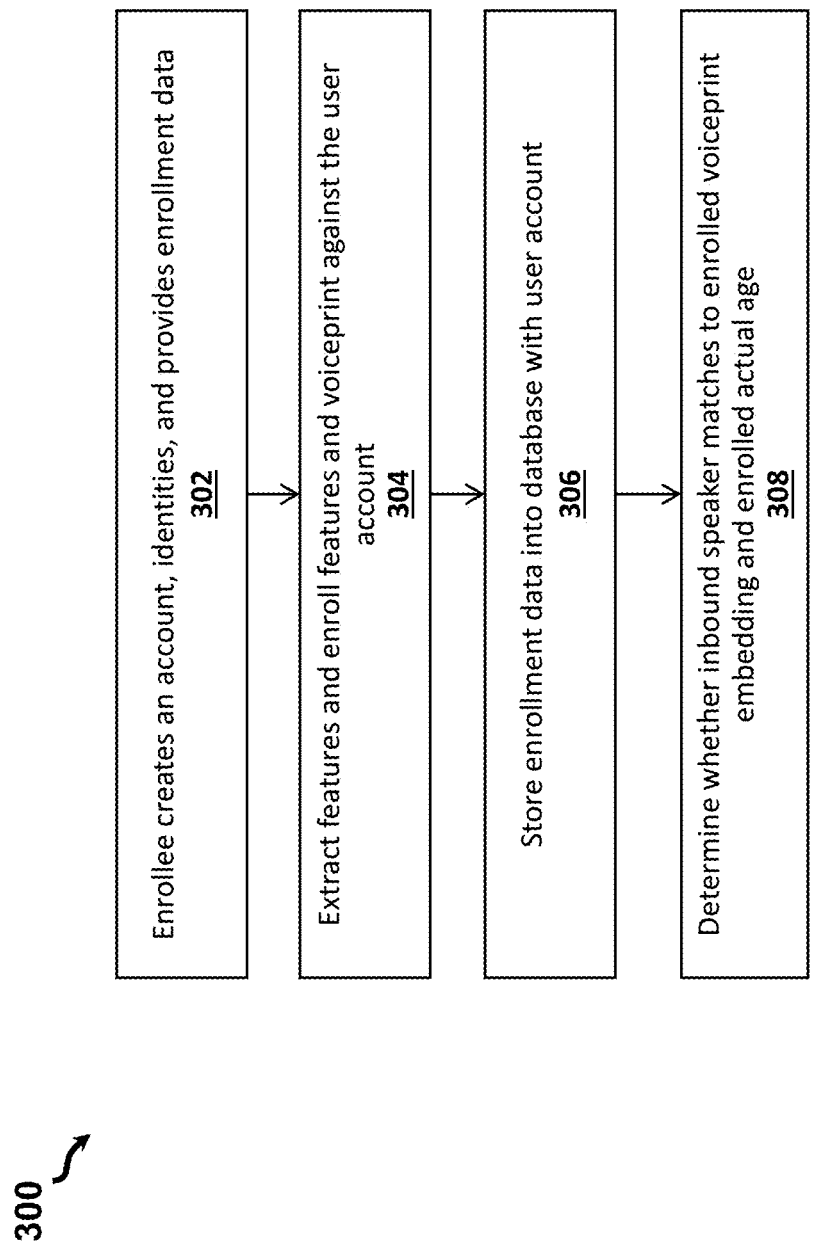
FIG. 3 shows steps of a method for registering an enrollee-user with a system employing a machine-learning architecture for extracting speaker embeddings and age estimation, according to an embodiment.

FIG. 3 shows steps of a method 300 for registering an enrollee-user with a system employing a machine-learning architecture for extracting speaker embeddings and age estimation. The machine-learning architecture receives enrollment information of the enrollee-user to include various types of information for speaker-age estimation when enrolling the enrollee's voice biometrics during an optional enrollment phase, and when later authenticating an enrolled speaker during a deployment phase. Embodiments may include additional, fewer, or different operations than those described in the method 300. A server (e.g., analytics server 102) performs the steps of the method 200 by executing machine-readable software code that includes the one or more machine-learning architectures, though embodiments may include any number of computing devices and/or processors that perform the various operations of the method 300.

The server executes a machine-learning architecture comprising layers or functions defining an embedding extractor and an age estimator, among other types of sub-component engines of the machine-learning architecture. In some embodiments, the machine-learning architecture includes multiple distinct machine-learning architectures; and in some embodiments, the machine-learning architecture includes a single machine-learning architecture. For ease of discussion, the machine-learning architecture of the example method 300 comprises the layers of the embedding extractor and the age estimator, though the embedding extractor and the age estimator could be components of distinct machine-learning architectures. The server executes the software routines of the layers and functions of the machine-learning architecture in various operational phases, including a training phase (not shown in the example method 300), the optional enrollment phase, and the deployment phase (sometimes referred to as the "testing phase" or "production phase").

The server ingests and applies the machine-learning architecture on one or more input audio signals, in accordance with the particular operational phase. The input audio signal refers to any audio signal that the server ingests and applies the machine-learning architecture on, such as training signals during the training phase, enrollment signals received during the enrollment phase, and inbound audio signals received during the deployment phase.

In step 302, an enrollee-user registers a new user account with the analytics system or service provider system according to various types of enrollment data. The server generates one or more new database records in user account databases (e.g., analytics database 104, provider database 112) and includes the various types of enrollment data (e.g., actual enrolled age, age distribution). In step 304, the embedding extractor of the machine-learning architecture extracts various enrollment features and speaker embedding feature vectors using the speech signal of enrollment audio signals. Using the extracted enrollment features and enrollment feature vectors, the server then generates an enrolled voiceprint embedding for the new enrollee-user. In step 306, the server stores enrollment features, enrolled voiceprint embedding, and enrolled speaker information (e.g., actual enrolled age, age distribution) into the user account database.

In step 308, the machine-learning architecture applies the embedding extractor on an inbound audio signal to generate an inbound speaker embedding. The embedding extractor determines a distance or similarity score based upon comparing the inbound speaker embedding against the stored enrolled voiceprint embedding. The embedding extractor may then determine whether the inbound speaker embedding satisfies a voice-match threshold score. Additionally or alternatively, the age estimator generates a predicted age distribution using the inbound speaker embedding and predicted age for the inbound speaker. The age estimator may compare the predicated age and/or predicted distribution against the enrolled actual age and/or expected distribution to determine whether the predicted age satisfies an age-match threshold distance from the enrolled actual age. The age estimator may also determine a level of error or confidence score based upon the distance between the predicted distribution and the expected distribution.

Example Machine-Learning Architecture

Figure 4A:
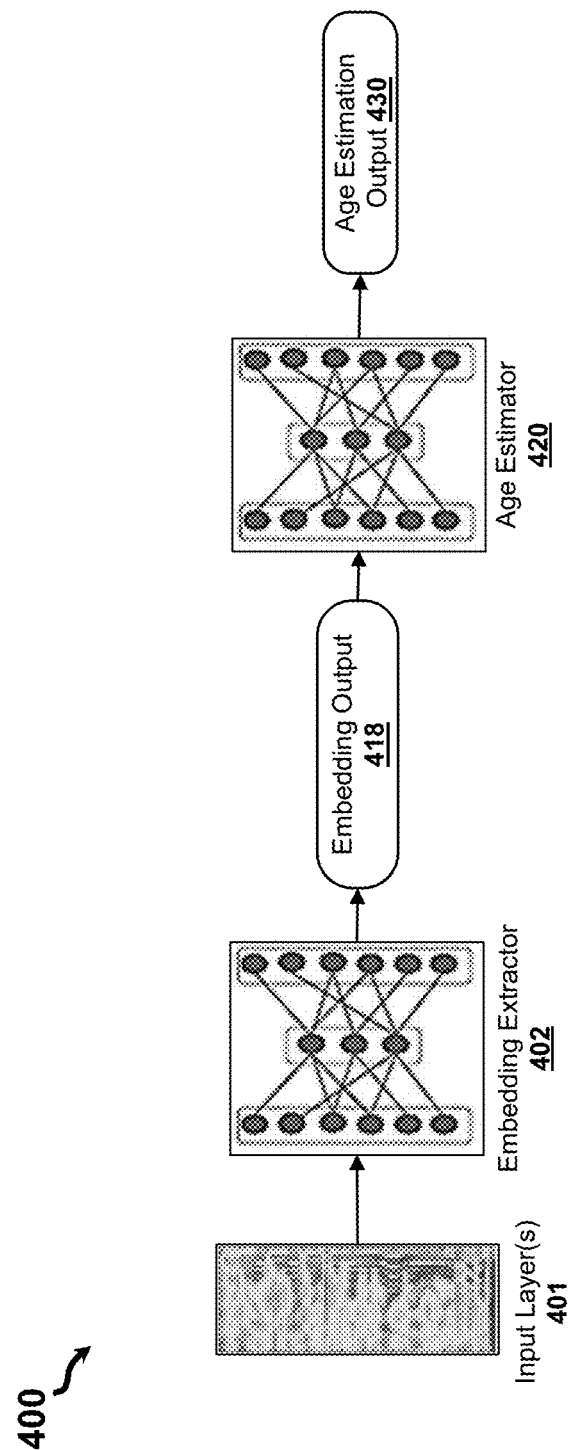
FIG. 4A shows a machine-learning architecture including one or more input layers, front-end embedding extractor, and the backend age estimator, according to an embodiment.
Figure 4B:
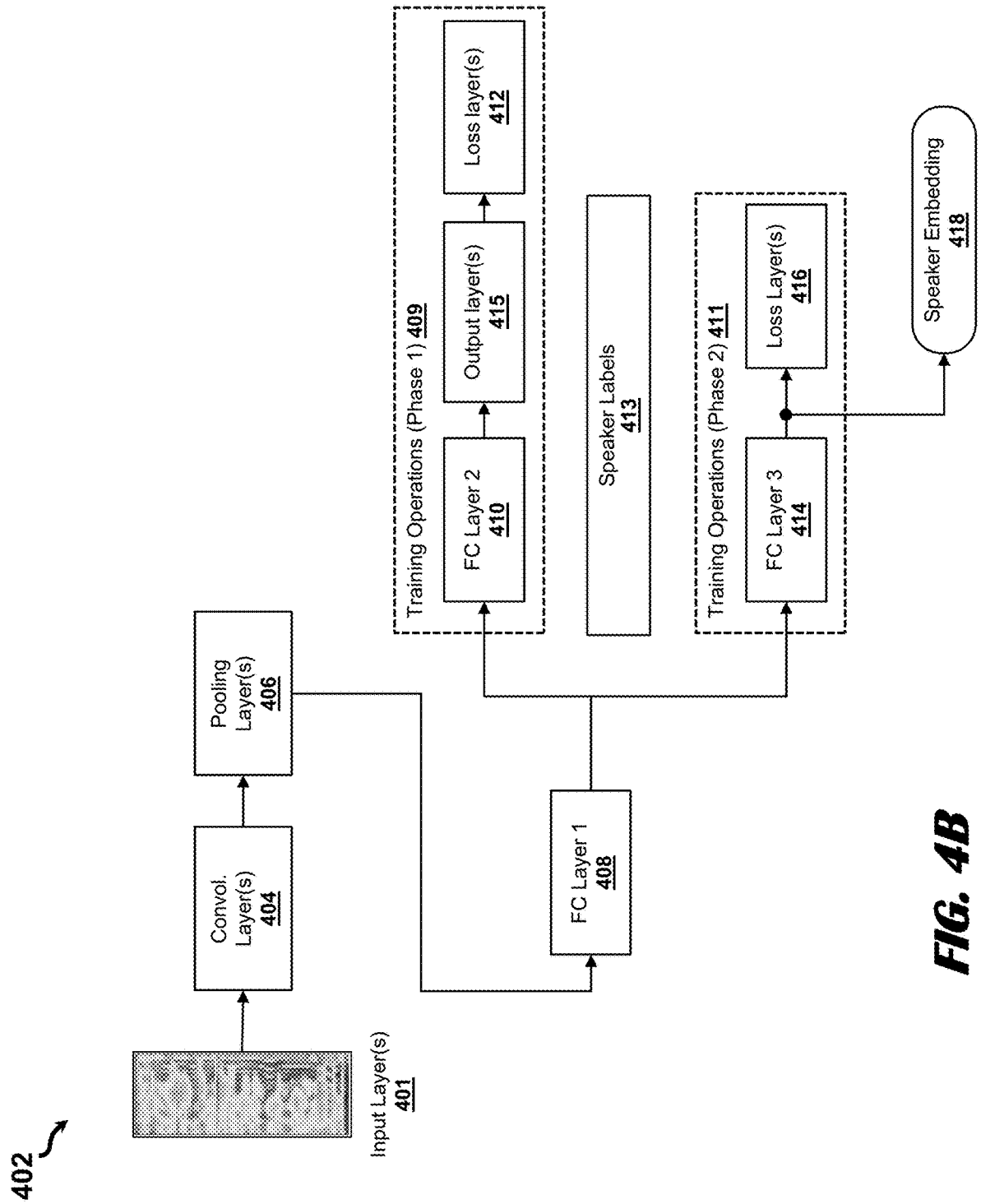
FIG. 4B shows component layers of the machine-learning architecture defining the front-end embedding extractor, according to an embodiment.
Figure 4C:
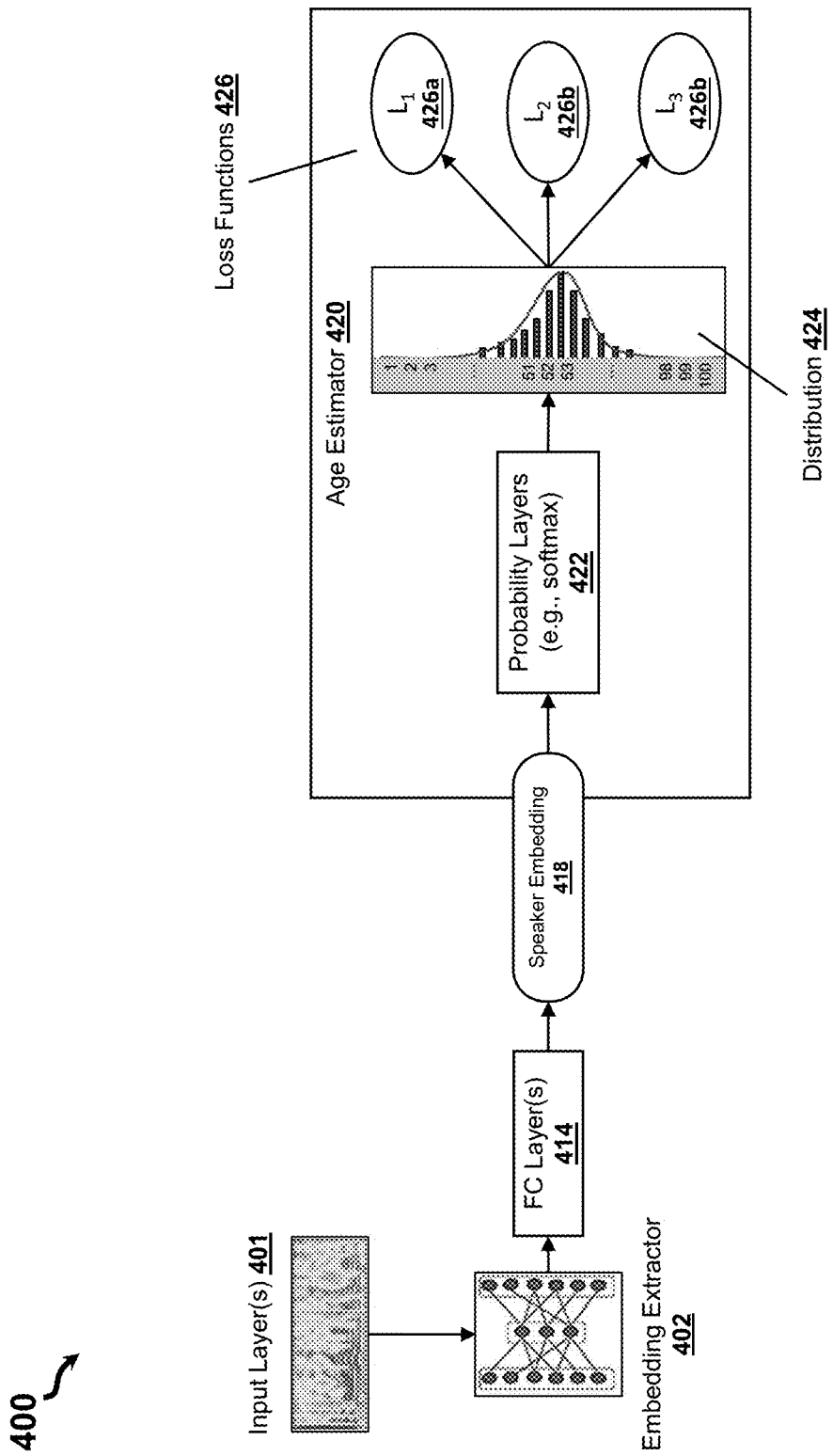
FIG. 4C shows components of the machine-learning architecture, including layers, functions, and outputs defining the backend age estimator, according to an embodiment.

FIGS. 4A-4C shows component layers and functions of a machine-learning architecture 400 for speaker age estimation and dataflow among the components. For ease of description, a server (e.g., analytics server 102) executes the software routines of the machine-learning architecture 400, though embodiments may include any number of computing devices of various types (e.g., servers, personal computers) that execute some or all of the of the software routines of the machine-learning architecture 400.

The machine-learning architecture 400 includes one or more neural network architectures defining an end-to-end system that ingests and processes audio data of an input audio signal. In some embodiments, the machine-learning architecture 400 includes in-network data augmentation layers (not shown) that selectively apply data augmentation techniques on the ingested audio data during the various operational phases of the machine-learning architecture 400 (e.g., training phase, enrollment phase). As such, the input audio signals of FIGS. 4A-4C could refer to training audio signals (e.g., clean audio signals, simulated audio signals) received during a training phase, enrollment audio signals received during an optional enrollment phase, or inbound audio signals received during the deployment phase. Embodiments may include additional or alternative operations, or may omit operations, from those shown in FIGS. 4A-4C, and still fall within the scope of this disclosure. In addition, embodiments may vary the order components of the machine-learning architecture 400 are executed.

Embodiments may include additional, fewer, or different operations than those described for the example machine-learning architecture 400. For ease of description, a server (e.g., analytics server 102) performs the operations of the machine-learning architecture 400 by executing machine-readable software code of the machine-learning architecture 400, though embodiments may include any number of computing devices and/or various types of computing devices that perform the operations of the machine-learning architecture 400. The machine-learning architecture 400 comprises layers or functions defining a front-end speaker embedding extraction engine ("embedding extractor 402"), and a backend speaker age estimation engine ("age estimator 420"), among other among other types of sub-component engines of the machine-learning architecture 400. In some embodiments, the machine-learning architecture 400 includes multiple distinct machine-learning architectures 400 that operate in concert; and in some embodiments, the machine-learning architecture 400 includes a single, integrated (or "fused") machine-learning architecture 400. The server executes the software routines of the layers and functions of the machine-learning architecture 400 in various operational phases, including a training phase, a deployment phase (sometimes referred to as the "testing phase" or "production phase"), and an optional enrollment phase.

The server ingests and applies the machine-learning architecture 400 on one or more input audio signals, in accordance with the particular operational phase. The input audio signal refers to the one or more audio signals that the server ingests and feeds into the machine-learning architecture 400. For instance, the input audio signal includes a training audio signal during the training phase; the input audio signal includes an enrollment signal during the enrollment phase; and the input audio signal includes an inbound audio signal during the deployment phase.

As shown in FIG. 4A, the machine-learning architecture 400 includes one or more input layers 401, the front-end embedding extractor 402, and the backend age estimator 420.

The input layers 401 include layers and functions for ingesting input audio signals, and performing pre-processing operations and/or data augmentation operations on the input audio signals. The input layers 401 may perform pre-processing techniques when ingesting the input audio signal or the features extracted from the input audio signals. These pre-processing techniques may include, for example, parsing the audio data into fixed frames or sub-frames, transforming the audio data from a time-domain representation into a frequency-domain representation according to an FFT of SFT algorithm, and performing normalization or scaling functions. For example, certain pre-processing operations often normalize or scale the transformed energy values to a scale having a range of [−1, 1], where −1 is an extreme low and 1 is an extreme high. Based on the transform algorithm or other operations performed on the input audio signal, the input layers 401 generate and output a dataset representing the input audio signal in a format for the embedding extractor 402 to extract various features and one or more feature vectors representative of the input audio signal.

The embedding extractor 402 includes layers and functions for extracting features representing speech in the audio signal, using the audio signal data ingested and pre-processed by the input layers 401. The embedding extractor 402 then extracts one or more speaker embeddings 418 for the speaker in the input audio signal, using the features extracted from the input audio signal data.

The speaker embedding 418 includes a mathematical representation of speech features of a speaker in an audio signal, such as the training embeddings, enrolled voiceprint, or production voiceprint. In the training phase, the embedding extractor 402 generates a training feature vector for each particular training audio signal. In the optional enrollment phase, the embedding extractor 402 generates an enrollment feature vector for each enrollment audio signal from an enrollee-speaker. The embedding extractor 402 algorithmically combines the enrollment feature vectors to generate a voiceprint embedding representing an enrolled user. In the deployment phase, the embedding extractor 402 generates an inbound feature vector (or "inbound voiceprint") for a production audio signal. In embodiments in which the embedding extractor 402 extracts multiple production feature vectors for the production audio signal, the embedding extractor 402 algorithmically combine the production feature vectors to generate a production voiceprint embedding. The embedding extractor 402 then outputs the production voiceprint to the backend of the machine-learning architecture 400.

The age estimator 420 includes layers and functions for estimating the age of a speaker in the particular input audio signal using the speaker embedding and, in some implementations, additional types of data about the speaker or the end-user device. The age estimator 420 receives the speaker embedding 418, as generated and fed from the embedding extractor 402. The age estimator 420 then generates the estimated age 430. During the training phase, the age estimator 420 generates a predicted training estimated age 430 and/or predicted probability distribution 424 for each of the training signals. In the optional enrollment phase, the enrollee provides the enrollee's age via a graphical user interface or the age estimator 420 generates an enrollee estimated age 430 and/or enrolled probability distribution 424 for the enrollment audio signals. During production time, the age estimator 420 generates an inbound estimated age 430 and/or an inbound probability distribution 424 for an inbound audio signal.

In some embodiments, the server or another device receives the outputs 418, 430 of the machine-learning architecture 400 and performs one or more downstream operations. For instance, during deployment, the server applies the machine-learning architecture 400 on the inbound audio signal, generates the inbound speaker embedding 418, and the inbound estimated age 430. Fully connected layers 408 of the embedding extractor 402 generate the speaker embedding 418 and a similarity score, indicating a distance or similarity between the inbound speaker embedding 418 and a stored enrolled voiceprint speaker embedding 418. The server identifies a potential match (or a likely match) between the inbound speaker and the enrollee when the similarity score satisfies a match threshold value. The server may further determine whether the enrolled age of the enrollee and the inbound estimated age 430 are within a match threshold value. A downstream authentication operation then determines whether to authenticate the inbound speaker as the enrolled speaker in accordance with the match-threshold determinations. This is merely a simplified example of a downstream operation, and other embodiments may implement any number of additional or alternative downstream operations (e.g., speaker authentication, speaker diarization) using the speaker embedding 418 or estimated age 430.

FIG. 4B shows components of the machine-learning architecture 400 defining the front-end embedding extractor 402. The embedding extractor 402 includes convolution layers 404, pooling layers 406, fully connected layers 408, 410, 414, and loss layers 412, 416.

One or more convolutional layers 404 ingest the audio signal data ingested or generated by the input layers 401, such as low-level features (e.g., MFCCs) extracted from the input audio signal. In some cases, the input layers 401 perform various pre-processing and/or data augmentation operations on the input audio signals that manipulate and/or transform the input audio signals into a data format usable by the embedding extractor 402. In some cases, the convolutional layers 404 further ingest additional types of data inputs from other data sources, such as training audio signals or simulated audio signals generated by the server or received from a database (e.g., analytics database 104, provider database 112). The convolutional layers 404 output the convolved features of the particular input audio signal to various pooling layers 406, which may include any number of statistics layers and/or normalization layers. The fully connected layers 408 perform various weighted operations on the results ingested from the pooling layers 406 to generate a feature vector (e.g., training feature vector, enrollment feature vector, production feature vector) for the particular input audio signal.

In some embodiments, the training phase of the embedding extractor 402 includes two sub-phases. In a first training phase 409, the server may freeze various hyper-parameters and/or disable certain layers of the embedding extractor 402 (e.g., layers of a second training phase 411). A second set of one or more fully connected layers 410 ingest the outputs from the first set of one or more fully connected layers 408, and similarly perform various weighted operations on the results ingested from the first fully connected layer 408 to generate a lower-dimensional feature vector. Output layer(s) 415 perform a softmax function using the lower-dimensional feature vector. A first set of one or more loss layer(s) 412 perform a cross-entropy operation on the outputs of the softmax function, which, in some implementations, references speaker labels 413 corresponding to the training audio signals. The loss layers 412 may adjust various parameters in the layers of the machine-learning architecture 400 based on the particular loss function performed.

For the second-phase training operations 411, the server freezes various hyper-parameters and/or disables certain layers of the embedding extractor 402 (e.g., layers of the first-phase training operations 409), and enables a third set of fully connected layer(s) 414 and a second set of loss layer(s) 416 of the second training phase 411. The server then re-feeds the input audio signals through some or all of the layers of the embedding extractor 402, which may include applying the first fully connected layer 408 to generate a feature vector. The third fully connected layer 414 performs various weighted operations on the feature vector ingested from the first fully connected layer 408 to generate another lower-dimensional feature vector for the particular training audio signal. The second set of loss layers 416 perform a large margin cosine loss (LMCL) function, which, in some implementations, reference the speaker labels 413 corresponding to the particular training audio signals. In some cases, the loss layers 416 may adjust various parameters in the layers of the machine-learning architecture 400 based on the LMCL.

In some implementations, during deployment (or enrollment), the server disables certain layers used for training, such as the second set of fully connected layers 410, the output layers 415, and/or the first set of loss layers 412. The server may continue to enable and apply other layers, such as the third set of fully connected layers 414 and the second set of loss layers 416. The feature vector generated by the second fully connected layers 414 becomes the speaker embedding 418 extracted and outputted for the particular input audio signal (e.g., inbound audio signal, enrollment audio signal), and referenced for downstream operations, such as age estimation and speaker verification.

In some embodiments, the second set of loss layers 416 generate a similarity or level of error score for the distance or similarity between a predicted speaker embedding 418 and an expected embedding, as indicated by the speaker labels 413 or an enrolled voiceprint. The server determines the speaker of an input audio signal likely matches an expected speaker or enrollee when the loss layers 416 determine that a similarity score or distance between the predicted speaker embedding 418 and the expected embedding is within a matching threshold similarity score or distance. For training, the server determines that the embedding extractor 402 is trained when the distance or similarly scores satisfy a training threshold level of error.

FIG. 4C shows components of the machine-learning architecture 400, including layers, functions, and outputs defining the backend age estimator 420. The age estimator 420 receives data from the fully connected layers 408, applies probability layers 422 to generate one or more probability distributions 424, and applies one or more loss functions 426a-426c (referred to collectively as "loss functions 426" or a "loss function 426"). As mentioned, the fully connected layers 414 of the embedding extractor 402 generate the speaker embedding 418 and feed the speaker embedding 418 to the age estimator 420.

The probability layers 422 include software routines and functions for performing various types of probability or normalization functions (e.g., softmax layers, dropout layers), generating probability distributions 424, and performing loss functions 426 according to one or more loss-learning techniques.

For distribution-based approaches, the age estimator 420 implements probability distributions 424 and loss functions 426 that consider and accommodate a level of ambiguity when estimating the speaker's age. When asked to estimate a person's age in a speech sample, humans can readily provide an age estimate and a particular confidence interval. This capability maps to a normal distribution around an estimated age 430 and a particular standard deviation. With this assumption of normal Gaussian distribution, the loss functions 426 for achieving such distribution learning losses include, for example, a Kullback-Leibler divergence (KLD) function ("KLD function 426a"), Generalized Jeffries-Matusita (GJM) distance function ("GJM distance function 426b"), and mean-and-variance loss function 426c. In the distribution-based approach, the loss functions 426 measure an amount of distance or similarity between two distributions (e.g., an expected probability distribution 424 and a predicted probability distribution 424).

In operation, the probability layers 422 incorporate the ambiguity in the ground truth by replacing each single speaker label 413 with a normal probability distribution 424 around the age indicated by the particular speaker label 413. A system administrator manually enters or the age estimator 420 automatically learns a standard deviation of the probability distribution 424. As the standard deviation of the assumed normal probability distribution 424 decreases, the standard deviation becomes sharper. At the limit (where standard deviation approaches zero), this approach approximates (or asymptotically approaches) the behavior of classification-based learning. The softmax layers of the probability layers 422 of the age estimator 420 may be trained to generate the estimated ages 430 using the speaker embeddings 418 and one or more probability distributions 424 as targets or expected outputs. When trained, the softmax layer generates the probability distribution 424 of the estimated age 430.

The KLD function 426a (or relative entropy) is a type of statistical distance measuring an amount of similarity or difference between probability distributions 424. The KLD function 426a requires the server to know a mean of the ground truth age and the standard deviation of the ground truth age, as indicated by or determined using the speaker labels 413. Oftentimes, however, the server has limited access to adequate training datasets with speaker labels 413 for training input audio signals. In these circumstances, the administrator may configure the age estimator 420 with a default standard deviation or a constant standard deviation.

The GJM distance function 426b is a type of statistical distance similar to the KLD function 426a. The GJM distance function 426b requires the server to know a distribution of the ground truth and the standard deviation of the ground truth age, as preconfigured by the administrator or indicated using the speaker labels 413. The administrator or the server may also preconfigure a stability or shape parameter (alpha) of the distribution of the ground truth.

The mean-and-variance loss function 426c is a linear combination of both mean and variance losses. A mean loss seeks to minimize the difference in the means of the probability distribution 424 generated by the softmax layers and the probability distribution 424 of the ground truth speaker label 413. A variance loss seeks to minimize the spread of the probability distribution 424 generated by the softmax layers. In many cases, the mean-and-variance loss function 426c can beneficially estimate the age distribution without explicitly needing to know the distribution of the ground truth.

Each of the loss functions 426 may adjust the hyperparameters and/or weights of the age estimator 420 or other portions of the machine-learning architecture 400 (e.g., embedding extractor 402) to achieve a training threshold statistical distance or similarity score according to the particular loss function 426. The server determines that the age estimator 420 is trained when the distance or similarity between the predicted probability distribution 424 and expected probability distribution 424 satisfy the particular training threshold. During deployment, the age estimator 420 generates the estimated age 430 as a set of one or more predicted age values or as a predicted distribution around a predicted age value. The age estimator 420 may further generate a confidence value for the estimated age 430 based upon, for example, an amount of deviation of the predicted age value and the predicted or expected distribution around the predicted age value.

Example Embodiments

In some embodiments, a computer-implemented method comprises obtaining, by a computer, a plurality of training speaker embeddings extracted for a plurality of training audio signals of a plurality of training speakers; training, by the computer, the age estimator of a machine-learning architecture to generate an estimated age and an estimated probability distribution by applying the age estimator on the plurality of training speaker embeddings of the plurality of training speakers using a plurality of speaker labels, each speaker label indicating an actual age of a corresponding training speaker; obtaining, by the computer, an inbound speaker embedding for an inbound audio signal of an inbound speaker; generating, by the computer applying the age estimator on the inbound speaker embedding, an inbound probability distribution for the inbound speaker; and generating, by the computer applying the age estimator on the inbound speaker embedding, an estimated age of the inbound speaker and a confidence score based upon the estimated probability distribution.

In some implementations, training the age estimator includes, for each training signal, generating, by the computer, a predicted age based upon applying the age estimator on the training embedding of the training signal; and determining, by the computer, a loss based on the difference between the predicted age and the actual age of the training speaker of the training signal according to the speaker label.

In some implementations, the method further comprises updating, by the computer, one or more weights of the age estimator based upon the loss.

In some implementations, generating the predicted age includes generating, by the computer, a predicted distribution for the predicted age of the training signal, wherein the predicted age is a mean of the predicted distribution. Determining the difference includes determining, by the computer, a distance between the predicted distribution and the probability distribution, wherein the computer updates the probability distribution based upon the distance.

In some implementations, the method further comprises determining, by the computer, that the age estimator is trained in response to determining that a difference between a predicted distribution and the probability distribution satisfies a training threshold.

In some implementations, the method further comprises updating, by the computer, one or more weights of the age estimator based upon the difference between the inbound distribution and the probability distribution to update training of the age estimator.

In some implementations, the method further comprises receiving, by the computer, from a database the actual age of a speaker label of a training speaker.

In some implementations, obtaining a training speaker embedding of training audio signal includes applying, by the computer, an embedding extractor of the machine-learning architecture on the training audio signal to extract a plurality of acoustic features for the training audio signal; and applying, by the computer, the embedding extractor on the plurality of acoustic features to extract the training speaker embedding for the training audio signal.

In some implementations, the method further comprises, responsive to the computer determining that the inbound speaker embedding satisfies a speaker-match threshold distance from an enrolled speaker embedding, and that the estimated age is in an age-match threshold distance from an enrolled age of the enrolled speaker: identifying, by the computer, the inbound speaker as an enrolled speaker, in response to the computer.

In some implementations, the method further comprises receiving, by the computer, one or more parameters of the probability distribution from a graphical user interface of an administrator device. The computer determines the probability distribution based upon the one or more parameters.

In some embodiments, a system comprises a computer comprising a processor configured to obtain a plurality of training speaker embeddings extracted for a plurality of training audio signals of a plurality of training speakers; train the age estimator of a machine-learning architecture to generate an estimated age and an estimated probability distribution by applying the age estimator on the plurality of training speaker embeddings of the plurality of training speakers using a plurality of speaker labels, each speaker label indicating an actual age of a corresponding training speaker; obtain an inbound speaker embedding for an inbound audio signal of an inbound speaker; generate, by applying the age estimator on the inbound speaker embedding, an inbound probability distribution for the inbound speaker; and generate, by applying the age estimator on the inbound speaker embedding, an estimated age of the inbound speaker and a confidence score based upon the estimated probability distribution.

In some implementations, when training the age estimator, the computer is further configured to, for each training signal, generate a predicted age based upon applying the age estimator on the training embedding of the training signal; and determine a loss based on the difference between the predicted age and the actual age of the training speaker of the training signal according to the speaker label.

In some implementations, the computer is further configured to update one or more weights of the age estimator based upon the loss.

In some implementations, when generating the predicted age, the computer is further configured to generate a predicted distribution for the predicted age of the training signal, wherein the predicted age is a mean of the predicted distribution. When determining the difference, the computer is further configured to determine a distance between the predicted distribution and the probability distribution, wherein the computer updates the probability distribution based upon the distance.

In some implementations, the computer is further configured to determine that the age estimator is trained, in response to the computer determining that a difference between a predicted distribution and the probability distribution satisfies a training threshold.

In some implementations, the computer is further configured to update one or more weights of the age estimator based upon the difference between the inbound distribution and the probability distribution to update training of the age estimator.

In some implementations, the computer is further configured to receive from a database the actual age of a speaker label of a training speaker.

In some implementations, when obtaining a training speaker embedding of training audio signal, the computer is further configured to apply an embedding extractor of the machine-learning architecture on the training audio signal to extract a plurality of acoustic features for the training audio signal; and apply the embedding extractor on the plurality of acoustic features to extract the training speaker embedding for the training audio signal.

In some implementations, the computer is further configured to, responsive to the computer determining that the inbound speaker embedding satisfies a speaker-match threshold distance from an enrolled speaker embedding, and that the estimated age is in an age-match threshold distance from an enrolled age of the enrolled speaker: identify the inbound speaker as an enrolled speaker.

In some implementations, the computer is further configured to receive one or more parameters of the probability distribution from a graphical user interface of an administrator device, wherein the computer determines the probability distribution based upon the one or more parameters.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   obtaining, by a computer, a plurality of training speaker embeddings extracted for a plurality of training audio signals of a plurality of training speakers;
   training, by the computer, an age estimator of a machine-learning architecture to generate an estimated age and an estimated probability distribution by applying the age estimator on the plurality of training speaker embeddings of the plurality of training speakers using a plurality of speaker labels, each speaker label indicating an actual age of a corresponding training speaker, wherein the computer trains the age estimator based upon comparing a predicted probability distribution against an expected probability distribution;
   obtaining, by the computer, an inbound speaker embedding for an inbound audio signal of an inbound speaker;
   generating, by the computer applying the age estimator on the inbound speaker embedding, an inbound probability distribution for the inbound speaker; and
   generating, by the computer applying the age estimator on the inbound speaker embedding, the estimated age of the inbound speaker and a confidence score based upon the estimated inbound probability distribution.

2. The method according to claim 1, wherein training the age estimator includes:
   for each training signal, generating, by the computer, a predicted estimated age based upon applying the age estimator on a training embedding of the training signal of a training speaker; and
   determining, by the computer, a loss based on a difference between the predicted estimated age and the actual age of the training speaker of the training signal according to the speaker label.

3. The method according to claim 2, further comprising updating, by the computer, one or more weights of the age estimator based upon the loss.

4. The method according to claim 2, wherein generating the predicted estimated age includes generating, by the computer, the predicted probability distribution for the predicted estimated age of the training signal, wherein the predicted estimated age is a mean of the predicted probability distribution; and
   wherein determining the difference includes determining, by the computer, a distance between the predicted probability distribution and the expected probability distribution, wherein the computer updates the expected probability distribution based upon the distance.

5. The method according to claim 1, further comprising determining, by the computer, that the age estimator is trained in response to determining that a difference between the predicted probability distribution and the expected probability distribution satisfies a training threshold.

6. The method according to claim 1, further comprising updating, by the computer, one or more weights of the age estimator based upon a difference between the inbound probability distribution and the expected probability distribution to update training of the age estimator.

7. The method according to claim 1, further comprising receiving, by the computer, from a database the actual age of a speaker label of a training speaker.

8. The method according to claim 1, wherein obtaining a training speaker embedding of a training audio signal includes:
   applying, by the computer, an embedding extractor of the machine-learning architecture on the training audio signal to extract a plurality of acoustic features for the training audio signal; and
   applying, by the computer, the embedding extractor on the plurality of acoustic features to extract the training speaker embedding for the training audio signal.

9. The method according to claim 1, further comprising:
   responsive to the computer determining that the inbound speaker embedding satisfies a speaker-match threshold distance from an enrolled speaker embedding, and that the estimated age is in an age-match threshold distance from an enrolled age of the enrolled speaker:

identifying, by the computer, the inbound speaker as the enrolled speaker, in response to the computer.

10. The method according to claim 1, further comprising receiving, by the computer, one or more parameters of the expected probability distribution from a graphical user interface of an administrator device, wherein the computer determines the expected probability distribution based upon the one or more parameters.

11. A system comprising:
a computer comprising a processor configured to:
obtain a plurality of training speaker embeddings extracted for a plurality of training audio signals of a plurality of training speakers;
train an age estimator of a machine-learning architecture to generate an estimated age and an estimated probability distribution by applying the age estimator on the plurality of training speaker embeddings of the plurality of training speakers using a plurality of speaker labels, each speaker label indicating an actual age of a corresponding training speaker, wherein the computer trains the age estimator based upon comparing a predicted probability distribution against an expected probability distribution;
obtain an inbound speaker embedding for an inbound audio signal of an inbound speaker;
generate, by applying the age estimator on the inbound speaker embedding, an inbound probability distribution for the inbound speaker; and
generate, by applying the age estimator on the inbound speaker embedding, the estimated age of the inbound speaker and a confidence score based upon the estimated inbound probability distribution.

12. The system according to claim 11, wherein, when training the age estimator, the computer is further configured to:
for each training signal, generate a predicted age based upon applying the age estimator on a training embedding of the training signal of a training speaker; and
determine a loss based on a difference between the predicted estimated age and the actual age of the training speaker of the training signal according to the speaker label.

13. The system according to claim 12, wherein the computer is further configured to update one or more weights of the age estimator based upon the loss.

14. The system according to claim 12, wherein, when generating the predicted estimated age, the computer is further configured to generate the predicted probability distribution for the predicted age of the training signal, wherein the predicted age is a mean of the predicted probability distribution; and
wherein, when determining the difference, the computer is further configured to determine a distance between the predicted probability distribution and the expected probability distribution, wherein the computer updates the expected probability distribution based upon the distance.

15. The system according to claim 11, wherein the computer is further configured to determine that the age estimator is trained, in response to the computer determining that a difference between the predicted probability distribution and the expected probability distribution satisfies a training threshold.

16. The system according to claim 11, wherein the computer is further configured to update one or more weights of the age estimator based upon a difference between the inbound probability distribution and the expected probability distribution to update training of the age estimator.

17. The system according to claim 11, the computer is further configured to receive from a database the actual age of a speaker label of a training speaker.

18. The system according to claim 11, wherein, when obtaining a training speaker embedding of a training audio signal, the computer is further configured to:
apply an embedding extractor of the machine-learning architecture on the training audio signal to extract a plurality of acoustic features for the training audio signal; and
apply the embedding extractor on the plurality of acoustic features to extract the training speaker embedding for the training audio signal.

19. The system according to claim 11, wherein the computer is further configured to:
responsive to the computer determining that the inbound speaker embedding satisfies a speaker-match threshold distance from an enrolled speaker embedding, and that the estimated age is in an age-match threshold distance from an enrolled age of the enrolled speaker:
identify the inbound speaker as the enrolled speaker.

20. The system according to claim 11, wherein the computer is further configured to receive one or more parameters of the expected probability distribution from a graphical user interface of an administrator device, wherein the computer determines the expected probability distribution based upon the one or more parameters.

* * * * *